United States Patent [19]

Brammer

[11] Patent Number: 4,750,777
[45] Date of Patent: Jun. 14, 1988

[54] SPLIT VENT TAILGATE

[75] Inventor: Robert C. Brammer, Traverse City, Mich.

[73] Assignee: Stromberg-Carlson Products, Inc., Traverse City, Mich.

[21] Appl. No.: 930,670

[22] Filed: Nov. 14, 1986

[51] Int. Cl.[4] .......................................... B62D 25/00
[52] U.S. Cl. ...................................... 296/50; 296/1 S; 403/292; 52/581
[58] Field of Search .................. 296/50, 57 R, 56, 61, 296/1 S; 403/292-298; 52/581

[56] References Cited

U.S. PATENT DOCUMENTS

| 97,808 | 2/1869 | Powell et al. | 296/50 |
|---|---|---|---|
| 109,965 | 12/1870 | Stocking et al. | 296/50 |
| 126,943 | 5/1872 | Fallick | 296/50 |
| 152,005 | 6/1874 | Partridge | 296/50 |
| 186,226 | 1/1877 | Block | 296/55 |
| 219,890 | 9/1879 | Zimmerman | 296/50 |
| 300,086 | 6/1884 | Keagy | 296/50 |
| 455,941 | 7/1891 | Gendron | 296/180 |
| 753,833 | 3/1904 | Copley | 296/181 |
| 1,119,585 | 12/1914 | Eldredge | 296/12 |
| 1,828,551 | 10/1931 | Walters | 296/183 |
| 1,952,883 | 3/1934 | Nelson | 296/50 |
| 2,315,448 | 3/1943 | Nagin et al. | 52/581 |
| 2,806,735 | 9/1957 | Smith | 296/51 |
| 3,025,985 | 3/1962 | Crawford | 296/57 R |
| 3,075,801 | 1/1963 | Silver | 296/28 |
| 3,148,912 | 9/1964 | Curtis et al. | 296/50 |
| 3,339,968 | 9/1967 | Hall | 296/61 |
| 3,785,695 | 1/1974 | Conkle | 296/50 |
| 4,098,493 | 7/1978 | Logan | 52/581 |
| 4,136,905 | 1/1979 | Morgan | 296/57 R |
| 4,165,118 | 8/1979 | Jensen | 296/50 |
| 4,353,589 | 10/1982 | Hartberg | 296/50 |
| 4,416,482 | 11/1983 | Patterson | 296/50 |

Primary Examiner—Robert R. Song
Attorney, Agent, or Firm—Price, Heneveld, Cooper, DeWitt & Litton

[57] ABSTRACT

A tailgate for a pickup type vehicle comprised of separate closure members arranged end-to-end and having adjacent ends abutting and rigidly secured to each other to form a single tailgate. Since the tailgate is comprised of separate closures, it can be easily shipped. The closure members can be readily assembled by the user and be used to replace existing tailgates. Moreover, due to the fact that the closure members may be covered with permeable material, it is well suited as a low drag replacement tailgate.

9 Claims, 1 Drawing Sheet

SPLIT VENT TAILGATE

BACKGROUND OF THE INVENTION

The present invention relates to tailgates, and the like, and in particular to a split vent tailgate.

Vented tailgates are used in conjunction with vehicles, such as pickup trucks, and the like, having a bed and sidewalls extending upwardly from the bed with the vented tailgate enclosing one of the open ends. Heretofore, vented tailgates have consisted of a unitary section of frame overlain with permeable material extending from one sidewall to the other, such as that disclosed in U.S. Pat. No. 4,353,589. In these designs, an elongated frame member, covered for the most part with wire mesh allowing free flow of air through it, is releasably attached to the sidewalls so that any particles resting on the bed are retained by the tailgate. In many cases, these tailgates are shipped and subsequently handled by a distributed, dealer or user. Therefore, the single piece construction of these designs can create difficulty in such shipping and handling.

SUMMARY OF THE INVENTION

One aspect of the present invention is to provide a tailgate for a pickup type vehicle, and the like, of the type having a bed and sidewalls being spaced from one another to form an open end. The tailgate is comprised of at least two separate elongated closure members arranged end-to-end having adjacent ends abutting each other. The closure members are connected to each other by connecting means, and means for securely attaching the nonadjacent ends of the connected closure members to form a single piece tailgate is provided.

The principal objects of the present invention are to provide a tailgate arrangement which reduces bulk in shipping, facilitates handling and can be easily assembled. The tailgate arrangement is quite uncomplicated and can be assembled with a minimum amount of effort and few tools. Bent or damaged sections can be easily replaced due to the tailgate's knock-down design. The tailgate is economical to manufacture, ship, handle, ideal for those seeking a low drag replacement tailgate since it is vented, and particularly well adapted for the proposed use.

These and other features, advantages and objects of the present invention will be further understood and appreciated by those skilled in the art by reference to the following written specification, claims and appended drawings.

DETAILED DESCRIPTION OF THE PREFERRED EMBODIMENTS

Figure 1:
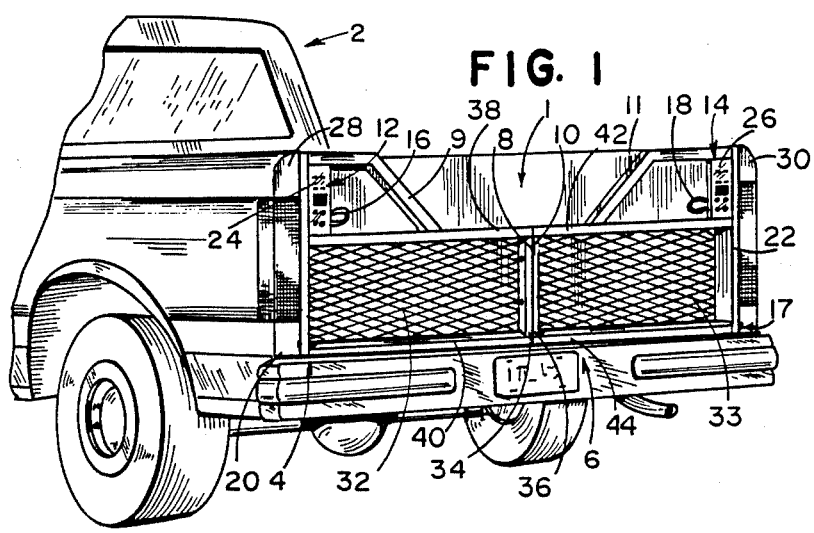
FIG. 1 is a partially schematic, perspective view of a split vent tailgate embodying the present invention and mounted on a pickup truck.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations and depth sequences, except where expressly specified to the contrary.

Figure 6:
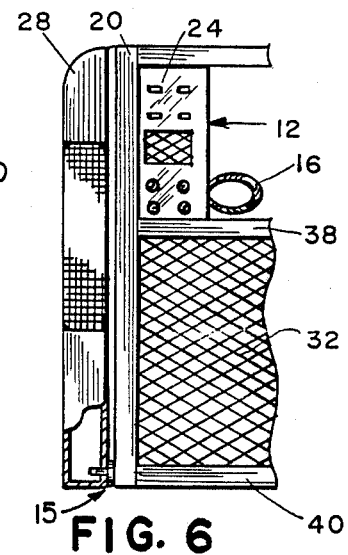
FIG. 6 is a fragmentary, elevational view of one of the hinged sides of the tailgate in FIG. 1.
Figure 2:
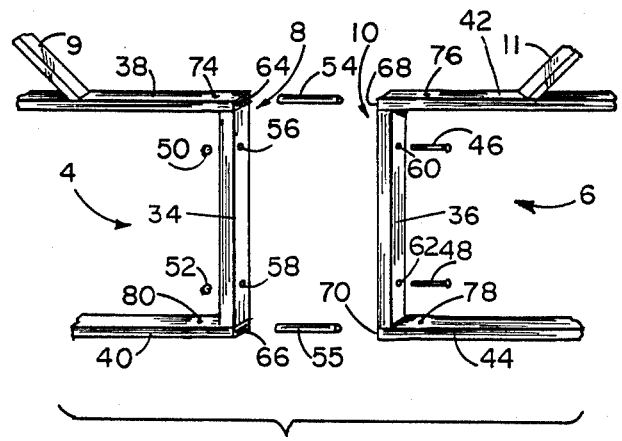
FIG. 2 is a fragmentary, perspective, exploded view of the connecting portion of the tailgate in a disassembled condition.

Reference numeral 1 (FIG. 1) generally designates a tailgate for a pickup type vehicle 2. Tailgate 1 is formed of separate closure members 4 and 6 arranged end-to-end and having adjacent ends 8 and 10 abutting each other. Closure members 4 and 6 are connected to each other at the adjacent ends 8 and 10 by connecting means (FIG. 2). At the nonadjacent ends of closure members 4 and 6 of tailgate 1 is provided any conventional type of hinge means 15 and 17 and releasable locking means 16 and 18 (FIGS. 1 and 6) such that tailgate 1 can be pivoted downwardly from sidewalls 28 and 30 when the truck is to be loaded and locked in the upward, closed position to sidewalls 28 and 30 when the truck is to be driven.

Closure member 4 consists of vertical frame members 20 and 34 and horizontal frames 38 and 40, with a covering 32 attached to frame members 20, 34, 38 and 40, to prevent any articles resting on the pickup bed from sliding out of the open end of tailgate 1. In this particular embodiment, covering 32 consists of perforate material allowing air to pass freely through it; however, within the broadest aspects of this invention, covering 32 could be an imperforate panel. directly above horizontal frame 38 and abutting vertical frame 20 is a support member 9 preventing any skewing by the rectangular portion of closure member 4. Attached to frame members 9 and 20 is connecting panel 12 including connector holder member 24 and releasable connector 16. When tailgate 1 is in an upright position and vertical frame 20 is abutting sidewall 28, the left side of closure member 4 can be releasably connected using connector 16.

Closure member 6, which is the mirror image of closure member 4, consists of vertical frames 22 and 36, and horizontal frames 42 and 44, with a covering 33 attached to frames 22, 36, 42 and 44, to prevent any articles resting on the pickup bed from sliding out of the open end of tailgate 1. As with covering 32, covering 33 could be an imperforate panel. Support member 11 and connecting panel 14 are the mirror images of support member 9 and connecting panel 12, respectively. Releasable connector 18 is connected to sidewall 30 like releasable connector 16 is connected to sidewall 28.

Figure 3:
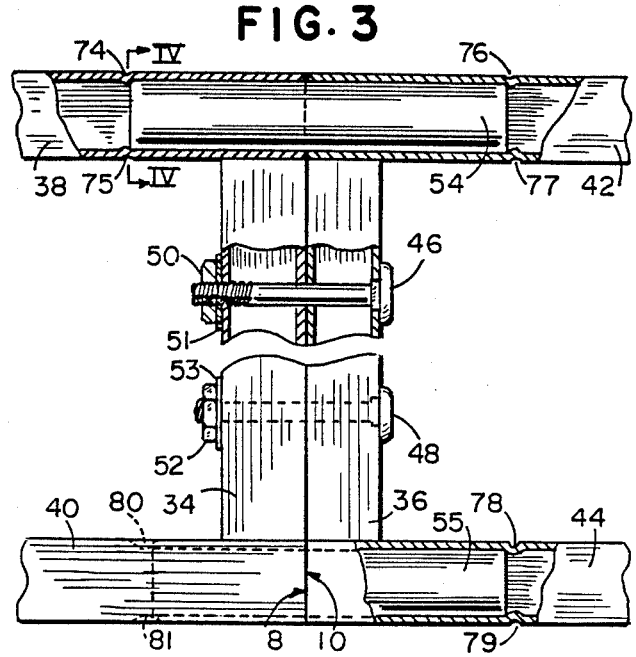
FIG. 3 is a fragmentary view of the connecting portion of the tailgate in an assembled condition partially cut away to disclose the details of construction.

The separate closures 4 and 6 (FIG. 1) are connected at adjacent, abutting ends 8 and 10 by connecting means 46, 48, 50, 52, 54 and 55 (FIG. 2). Round head machine screws 46 and 48 are received by apertures 56, 60 and 58, 62 having circular cross sections, respectively, and screws 46 and 48 are mated with both 50, 51, and 52, 53 respectively, to connect vertical frames 34 and 36 together (FIG. 3). Rigid cylindrical tubes 54 and 55 are closely received by apertures 64, 68 and 66, 70 having square cross sections, respectively (FIG. 2), so that horizontal frames 38, 40, 42 and 44 cannot move either up, down, to the front or to the rear when tailgate 1 is connected to pickup 2 as in FIG. 1.

Figure 4:
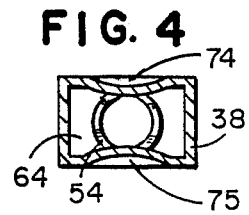
FIG. 4 is a sectional view taken along IV—IV of FIG. 3.
Figure 5:
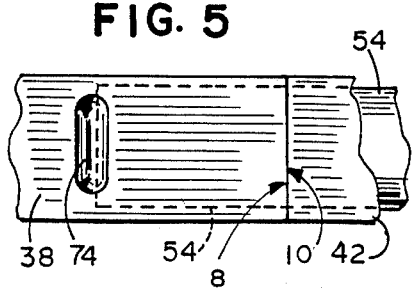
FIG. 5 is a fragmentary, top plan view taken at one of the dimples of the horizontal frame.

Connecting member 54, which is identical to connecting member 55, is preferably of a set length such that it rests against dimples 74 and 75, as well as dimples 76 and 77 (FIG. 3), while still allowing horizontal frames 38 and 42 to abut one another. More specifically, connecting member 54 is preferably held in place by dimples 74 and 75, as well as dimples 76 and 77, so that connecting member 54 cannot slide in a longitudinal direction to the left or the right (FIG. 4). Dimples are implanted on the top and bottom of each horizontal frame (FIG. 2), at a distance from either aperture 64, 66, 68 or 70 in a longitudinal direction, with a sizing tool making oval indentures. Accordingly, one of the dimples, as viewed from the top or bottom of either horizontal frame 38, 40, 42 or 44, takes on the appearance as shown in FIG. 5.

METHOD OF ASSEMBLY ABOVE

Tailgate 1 is constructed by sliding connecting members 54 and 55 into apertures 64, 68 and 66, 70, respectively, and pulling closure members 4 and 6 together until adjacent ends 8 and 10 abut one another (FIG. 2). After inserting round head machine screws 46 and 48 into apertures 56, 60 and 58, 62, respectively, bolts 50 and 52 are preferably screwed onto screws 46 and 48, respectively, making sure that washers 51 and 53 are employed accordingly, until closure members 4 and 6 are firmly fastened to one another. Upon constructing tailgate 1, it is preferably placed at the open end of pickup 2 into hinges 15 and 17 (FIG. 1) and releasably connected in an upright position with connectors 18 and 20 to sidewalls 28 and 30, respectively.

Due to the construction of tailgate 1, it can be easily disassembled and stacked for economical as well as efficient shipment. It is easy to assemble with the minimum amount of simple tools and is ideal as a replacement tailgate, for those seeking a tailgate with less drag, because the closure member coverings are vented. Due to the configuration of the support members, the tailgate is readily adapted for "fifth wheel" use. Moreover, in case of damage to the tailgate, replacement of any of its parts is facilitated by the tailgate's knock-down design.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a tailgate for a pickup type vehicle and the like of the type having a bed and sidewalls extending upwardly from said bed along each side, said sidewalls being spaced from one another to form an open end and said tailgate extending across said open end of said vehicle whereby any articles resting on said bed are contained therein by said tailgate, the improvement comprising:

at least two separate elongated closure members, each of said closure members including a front surface facing forwardly and a rear surface facing rearwardly when said tailgate is in the vertical closed position;

said closure members arranged end-to-end and having adjacent ends abutting each other;

connecting means for connecting said abutting ends of said members to one another to form said tailgate, said connecting means being situated between said closure front surfaces and said closure rear surfaces whereby said closure members and connecting means can be shipped and handled disassembled to facilitate ease in shipment and handling and subsequently assembled to form said tailgate and said tailgate can be constructed to provide a firm and compact connection at said closure abutting ends;

each closure member being provided with horizontal top and bottom frame members, each frame member having longitudinally located apertures, said apertures of the abutting closure members, which are situated between said closure front surfaces and said closure rear surfaces, being aligned, said connecting means including elongated pin members received within the apertures of abutting closure members for assisting in the connecting of the closure members together; and means for releasably attaching said nonadjacent ends of said closure members to said sidewalls.

2. The improvement of claim 1 in which there is provided for each closure member vertical frame members along the sides of each said closure members, each abutting vertical frame member having laterally extending apertures transverse to said abutting vertical frame member, each aperture being located between the top and bottom of said abutting vertical frame member and between said closure front surfaces and said closure rearward surfaces, said apertures of the abutting closure members being aligned; and elongated connecting members received within the apertures of abutting closure members for assisting in the connecting of the said closure members together.

3. A tailgate for a pickup type vehicle and the like of the type having a bed and sidewalls extending upwardly from said bed along each side, said sidewalls being spaced from one another to form an open end and said tailgate extending across said open end of said vehicle whereby any articles resting on said bed are contained therein by said tailgate, said tailgate comprising:

at least two separate elongated closure members;

said closure members arranged end-to-end and having adjacent ends abutting each other, each closure member having a combinative frame including horizontal top and bottom frame members each having longitudinally located first apertures, said first apertures of the abutting closure members being aligned as well as vertical frame members along the sides of each of said closure members, each abutting vertical frame member having laterally extending second apertures transverse to said abutting vertical frame member, each second aperture being located between the top and bottom of said abutting vertical frame member, said second apertures of the abutting closure members being aligned;

connecting means for connecting said abutting ends of said closure members to one another to form said tailgate, said connecting means including elongated pin members received with the first apertures of abutting closure members and elongated bolting members received with the second apertures of abutting closure members for assisting in the connecting of the said closure members together whereby said closure members and connecting means can be shipped and handled disassembled, to facilitate ease in shipment and handling and subsequently assembled to form said tailgate; and means for releasably attaching said nonadjacent ends of said vertical frame members to said sidewalls.

4. The tailgate of claim 3 in which the space between the frame members is overlain by a perforate material which is suitably affixed to the frame members.

5. The tailgate of claim 4 in which the horizontal frames are suitably crimped at some distance away from the first apertures in the longitudinal direction so that said elongated pin members received by said first apertures are held in place.

6. In a tailgate for a pickup type vehicle and the like of the type having a bed and sidewalls extending upwardly from said bed along each side, said sidewalls being spaced from one another to form an open end and said tailgate extending across said open end of said vehicle whereby any articles resting on said bed are contained therein by said tailgate, the improvement comprising:

first and second elongated closure members, each of said closure members being surrounded about its periphery by tubular framing members, and said framing members being overlain by perforate material whereby air can flow through each said closure member, each of said closure members including a front surface facing forwardly and a rear surface facing rearwardly when said tailgate is in the vertical closed position;

said closure members arranged end-to-end and having adjacent framing members abutting each other;

connecting means for connecting said abutting framing members of said closure members to one another to form said tailgate, said connecting means being situated between said closure front surfaces and said closure rear surfaces whereby said closure members and connecting means can be shipped and handled disassembled to facilitate ease in shipment and handling and subsequently assembled to form said tailgate and said tailgate can be constructed to provide a firm and compact connection at said abutting framing members;

longitudinally located apertures being provided in the top and bottom of each frame member, said apertures of the abutting framing members, which are situated between said closure front surfaces and said closure rear surfaces, being aligned, said connecting means including elongated pin members received within the apertures of abutting framing members for assisting in the connecting of the closure members together; and means for releasably attaching said nonadjacent ends of said closure members to said sidewalls.

7. In a tailgate for a pickup type vehicle and the like of the type having a bed and sidewalls extending upwardly from said bed along each side, said sidewalls being spaced from one another to form an open end and said tailgate extending across said open end of said vehicle whereby any articles resting on said bed are contained therein by said tailgate, the improvement comprising:

first and second elongated closure members, each of said closure members being surrounded about its periphery by tubular framing members, and said framing members being overlain by perforate material whereby air can flow through each said closure member;

said closure members arranged end-to-end and having adjacent framing members abutting each other, each abutting framing member having laterally extending apertures transverse to said abutting framing member, each aperture being located between the top and bottom of said abutting framing member, said apertures of the abutting framing members being aligned;

connecting means for connecting said abutting framing members of said closure members to one another to form said tailgate, said connecting means including elongated bolting members received within the apertures of said abutting framing members for assisting in the connecting of the said closure members together whereby said closure members and connecting means can be shipped and handled disassembled to facilitate ease in shipment and handling, and subsequently assembled to form said tailgate;

longitudinal apertures being located at the top and bottom of said framing members, said longitudinal apertures of the abutting framing members being aligned; and elongated pin members being received within the longitudinal apertures of abutting framing members for further assisting in the connecting of the closure members together; and means for releasably attaching said nonadjacent ends of said closure members to said sidewalls.

8. The tailgate of claim 7 in which the framing members are suitably crimped some distance away from the longitudinally located apertures at the top and bottom so that said elongated pin members received with those apertures are held in place.

9. A tailgate for a pickup type vehicle of the type having a bed and sidewalls extending upwardly from said bed along each side, said sidewalls being spaced from one another to form an open end and the tailgate extending across said open end of the vehicle whereby any articles resting on said bed are contained therein by said tailgate, said tailgate comprising:

said tailgate being formed of a pair of frame members, each of said frame members having a front surface facing forwardly and a rear surface facing rearwardly when said tailgate is in the vertical closed position;

said frame members each including horizontal tubular members at the top and bottom thereof, said tubular members each having longitudinal apertures, said longitudinal apertures being located between said frame front surfaces and said frame rear surfaces, the top and bottom horizontal members of one frame being aligned with the top and bottom horizontal tubular frame members of the other frame whereby the apertures of the top and bottom horizontal frame members of one frame are aligned with the apertures of the top and bottom tubular frame members of the other frame;

a first pin received within the said aligned apertures of the top horizontal tubular frame members and a second pin received within the said aligned apertures of the bottom horizontal frame members for assisting in the connecting of the frames together;

means for securing said horizontal tubular members together, said means being located between said frame front surfaces and said frame rear surfaces;

panel means secured to said frames; and means for releasably attaching said tailgate formed by said panel means to said sidewalls.

* * * * *